Sept. 8, 1959 R. T. ADAMS 2,903,577

DIVERSITY RECEIVING SYSTEM

Filed Oct. 10, 1955

INVENTOR
ROBERT T. ADAMS
BY Ernest Fanwick
ATTORNEY 2,903,577
Patented Sept. 8, 1959

2,903,577

DIVERSITY RECEIVING SYSTEM

Robert T. Adams, Short Hills, N.J., assignor to International Telephone and Telegraph Corporation, Nutley, N.J., a corporation of Maryland Application October 10, 1955, Serial No. 539,451

3 Claims. (Cl. 250—20)

Figures 1, 2:
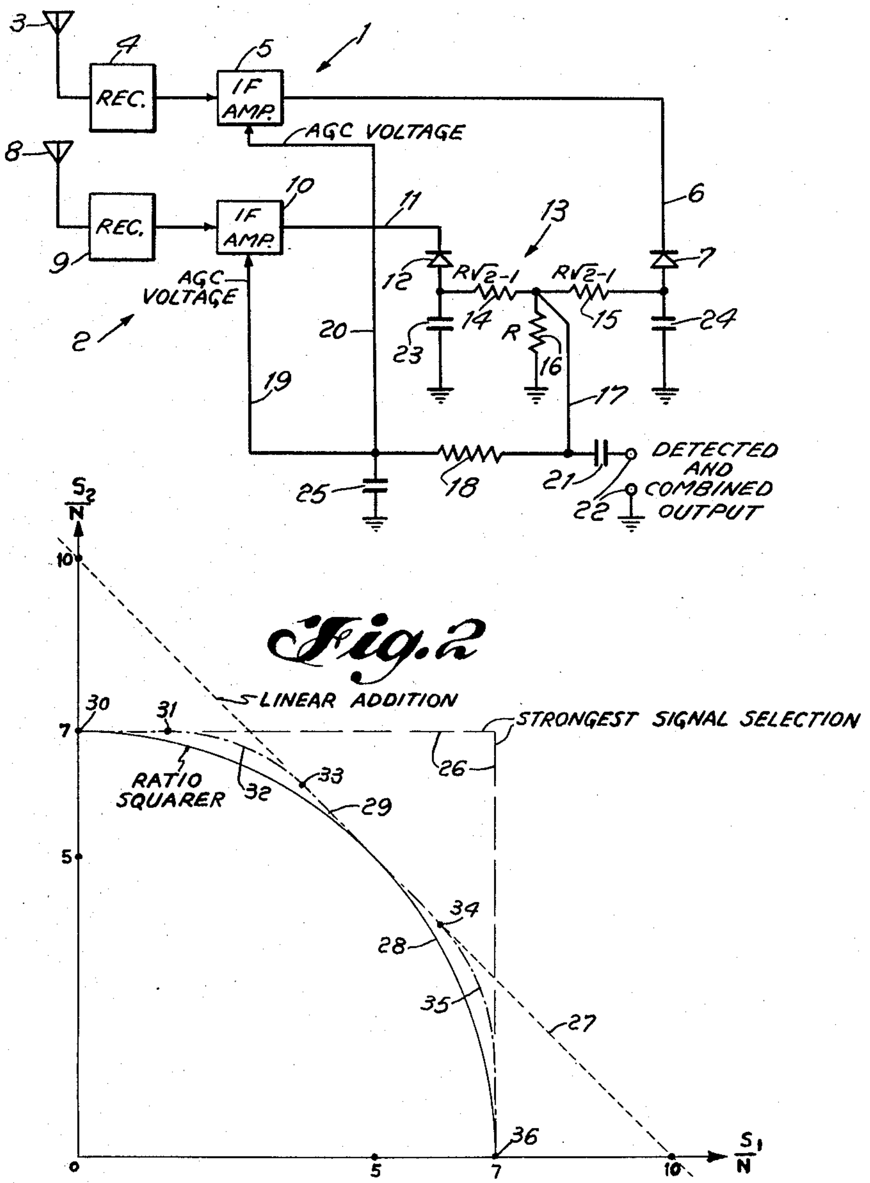

This invention relates to a diversity receiving system and, more particularly, to a diversity receiving combining system for amplitude modulated signals in which the signals are combined in accordance with a simulated optimum diversity combining law.

Diversity reception of radio signals is a well-known method of reception applied with success to short-wave transmissions in order to minimize the fading effects. It has long been felt that proper operation of a diversity receiving system requires a mode of operation for the combining of the signals which would produce the best signal-to-noise ratio possible. Prior art systems have attempted to improve the output signal-to-noise ratio by selecting one of the signals present in the receiving channels of the diversity system in order to eliminate the weaker of the two diversity signals and accept only the stronger signal. Such a mode of operation produced a signal-to-noise ratio equal only to the best diversity signal. Another method of combining the receiving signals in each channel, which has been described in the prior art, is a system which linearly adds the signals in each channel to produce a combined output. Such a system may or may not be better than the selector method of operation, depending upon the relative signal-to-noise ratios in each channel.

Recently, there has appeared an article in the "Proceedings of the Institute of Radio Engineers" for November, 1954, volume 42, page 1704, by Mr. Leonard R. Kahn, in which is described a diversity combining system called the ratio-squarer system in which the optimum diversity combining law is utilized so that at all times the combined signal-to-noise ratio is greater than or at least equal to the best of the individual diversity channel signal-to-noise ratios.

In a copending patent application serial No. 537,415 filed September 29, 1955, titled "A Diversity Receiving System," by F. J. Altman and assigned to the same assignee as this application, a diversity reception system in which the signals in each channel are combined in accordance with a simulated optimum diversity combining law was disclosed.

One of the objects of this invention therefore, is to provide a diversity reception system for amplitude modulation signals in which the detected signals derived from each channel of the receiving system are combined in an attenuation network.

Another object of this invention is to provide a diversity reception system in which the detected amplitude modulated signals are combined to produce optimum signal reception with a maximum of equipment simplicity and in which the combined signals are used to control the gain in each channel of the diversity system.

A further object of this invention is to provide a diversity reception system functioning in accordance with a diversity combining law which combines the advantages of the previously known combining systems to produce a simple diversity reception system operating substantially in accordance with an optimum combining law and which is suitable for amplitude modulated signals.

One of the features of this invention is the provision of a diversity reception system having a first and second channel each producing a signal voltage. The signal voltages in each channel are coupled to detecting means associated with each channel. A portion of the detected voltage output developed in one of the channels is coupled to the output of the detector in the other channel in such a manner as to oppose the current flow output of the other channel. The outputs of the detectors in each channel are then combined to produce the output of the system.

Another feature of this invention is the development of an automatic gain control signal responsive to the combined outputs of the detector which is fed back to the receiving means in each channel to adjust the amplitude thereof.

The above-mentioned and other features and objects of this invention will become more apparent by reference to the following description taken in conjunction with the accompanying drawing, in which:

Fig. 1 is a schematic drawing in block form of one embodiment of a diversity receiving system in accordance with the principles of my invention; and Fig. 2 shows the loci of input signal-to-noise combinations for an average output signal-to-noise ratio of seven in accordance with various diversity reception combining laws.

Referring to Fig. 1 of the drawings, a schematic diagram in block form of a simplified embodiment of the diversity receiving combining system in accordance with the principles of my invention is shown to comprise a first and second receiving channel each generally indicated by the numerals 1 and 2, respectively. Referring to channel 1, the signal transmissions are picked up by an antenna 3 and coupled to a receiver 4. The output of the receiver 4 is passed through the intermediate-frequency (I.-F.) amplifier and coupled over line 6 to a rectifier, detector or unidirectional device 7. The signal transmissions are also picked up by antenna 8 in receiving channel 2 and coupled to the receiver 9 whose output is passed through the I.-F. amplifier 10 and coupled over line 11 to a second rectifier, detector or unidirectional device 12. The detectors 7 and 12 are coupled in a back-to-back relation through an attenuation network or a common load generally indicated at 13. The attenuation network 13 coupling the detectors 7 and 12 together operates in such a manner that the detector located in the channel having the stronger signal conducts and a bias voltage is coupled over the network 13 to cut off the other detector provided the signal passed by the other detector is below a predetermined amplitude relative to the signal level passed by the first detector. The common load 13 comprises a plurality of resistors 14, 15 and 16 arranged in a T network where the arms of the T, or resistors 14 and 15, are of equal value and the leg of the T, resistor 16, is of greater value. It is obvious that other equivalent networks, such as $\pi$ network or other attenuator structures, may be substituted for the T network shown.

An output-coupling line 17 is coupled from the junction of the resistors 14, 15 and 16 and connects a voltage over resistor 18 and lines 19 and 20 back to the I.-F. amplifiers 5 and 10. The voltage coupled over resistor 18 to the I.-F. amplifiers 5 and 10 is an automatic gain control (AGC) voltage and is utilized to raise the output of the I.-F. amplifier 5 or 10 having the stronger signal to a desired level. Obviously, the output of the other amplifier, i.e., the one having the lesser signal voltage, is also increased in response to the AGC voltage but not up to the desired level. The detected output coupled over line 17 is passed through capacitor 21 to output-coupling terminals 22, forming the detected and combined output of the amplitude modulated diversity combining system of this invention.

Referring to Fig. 2 of this invention, the graph therein shown illustrates the loci of input signal-to-noise combinations for an average output signal-to-noise ratio of seven in accordance with various diversity receiving combining laws. The first type of diversity combining system known to the prior art may be termed the selector system in which the system determines which of the channels has the stronger signal and passes that signal to the output and rejects the weaker of the two signals. This mode of operation obviously produces a signal-to-noise ratio which can be no better than the signal-to-noise ratio in one of the channels. Thus, referring to dashed curve 26 in Fig. 2, it is apparent that, if the input signal-to-noise ratio $S_1/N$ in channel 1 is 7 db and the signal-to-noise ratio $S_2/N$ in channel 2 is anything less than 7 db, the output signal will be the signal present in channel 1, and of course, the opposite holds true if the stronger signal is present in channel 2. Thus, the output of the selector method of combining diversity signals is either $S_1/N$ or $S_2/N$, where $S_1$ and $S_2$ are the signals present in the first and second channels of the diversity system, respectively.

It has been apparent for some time that it may not be desirable to completely discard the weaker of the diversity signals; and thus, the common AGC or linear adder method of combining diversity signals was devised. The method of addition is illustrated by the dotted straight line 27 in Fig. 2. In this linear adder system of combining signals, the signal-to-noise powers and signal voltages are added linearly. Thus, if the signal in channel 2 ($S_2$) should be zero, the signal in channel 1 ($S_1$) must be 3 db better or must have a signal-to-noise ratio $S_1/N$ equal to 10 in order to produce an output signal having an average signal-to-noise ratio equal to the signal-to-noise ratio represented by curve 26. However, it is apparent that, so long as the signal in the weaker channel does not go below 7 db, the linear adder method of diversity reception combining gives an output voltage which is better than the selector method of combining signals, and this is diagrammatically illustrated by the portion of curve 27 between the two lines forming curve 26. The output of the linear adder method can be shown to be $$S_1+S_2/N\sqrt{2}$$

assuming that the signals from the diversity channels add linearly while the noises add in a root-mean-square fashion and a two-channel diversity system is utilized with the noise in one channel being of a random nature and substantially equal to the noise in the other channel.

In the publication previously alluded to above, it is shown that the optimum diversity combining law entitled the "Ratio-Squarer Method" yields the solid line curve 28 which is a quarter circle having a radius equal to a 7 db output signal-to-noise ratio and which at all points produces an output or combined signal-to-noise ratio which is greater than the best of the individual channel signal-to-noise ratios and which, in all instances, is better than either the selector or linear addition method of combining signals shown by curves 26 and 27. The output signal-to-noise voltage is determined by the equation $$\sqrt{\frac{S_1 2+S_2 2}{N}}$$

which is, of course, seen to be the equation for a circle.

Although it is recognized that the ratio-squarer method produces the optimum combination of signals, it must be realized that additional equipment is necessary in order to combine the signals in each channel in accordance with the ratio-squarer law. This invention simulates the combination of signals in the diversity channel system in accordance with the ratio-squarer law while still maintaining equipment simplicity substantially equal to that of the linear adder and selector combining systems.

Thus, referring again to Fig. 2, the output voltage signal-to-noise ratio curve of this invention is represented by the dash-dot curve 29. The output curve of this invention follows curve 26 from point 30 to point 31, which is the same as following the selector system of combining signals, and then proceeds along curve 32. The output curve 29 then proceeds from point 33 to point 34, following the linear adder combining law, and then along curve 35 before once again proceeding along the selector curve 26 to point 36. The resultant output curve 29 of this invention closely approximates the ratio-squarer combining law curve 30.

Referring again to Fig. 2, it is seen that between point 30 and point 31, if the input signal-to-noise ratio in the second channel is less than the value indicated by point 31, it must be rejected; but when it exceeds the value shown by point 31, it is then linearly added to the signal in the first channel. This is accomplished in my invention by coupling the output of one detector to oppose the current flow output of the other detector. Thus if the output of the one detector exceeds the output of the other detector, the other detecor will be biased beyond cutoff. Gradually as the outputs of the two detectors approach equality, they will both contribute to the output of the system and this is represented in Fig. 2 by curve 32, the curve from points 33 to 34 and curve 35. It is of course, obvious that other output curves are obtainable by varying the values of the elements in the attenuator network coupling together the detectors in each channel.

Referring again to Fig. 1 of the drawing, I have found for best approximation, of the optimum combining curve and for most satisfactory operation resistors 14 and 15 should be approximately .414 times the value of the resistance of impedance 16 or the value of each resistance 14 and 15 be the value of impedance 16 times the square root of 2 minus 1. In operation, assuming that channel 1 has the greater signal voltage present which is then rectified by detector 7 and coupled through resistors 15 and 14 to the detector 12, it is apparent that, if the signal present in channel 2 coupled over line 11 is substantially less than .414 times the amplitude of the signal in channel 1, the biasing voltage coupled from channel 1 through resistors 15 and 14 will substantially cut off the rectifier 12. If the signal in channel 2 is substantially greater than .414 times the amplitude of the signal in channel 1, a voltage is coupled over resistor 14 from channel 2 because the biasing voltage is not great enough to cut off the detector 12, and this voltage across the resistor 14 is combined with the voltage across resistor 15 and coupled through resistor 18 to form the AGC voltage. Simultaneously, the output over line 17 comprises the detected output of the diversity combining system of this invention.

While I have described above the principles of my invention in connection with specific apparatus, it is to be clearly understood that this description is made only by way of example and not as a limitation to the scope of my invention as set forth in the object thereof and in the accompanying claims.

I claim:

1. A diversity receiving combining system for use in a diversity reception system having a first and second receiving channel comprising first receiving means associated with said first channel and second receiving means associated with said second channel, first and second detector means each associated with one of said channels and each having an input and output terminal, means to couple the outputs of said first and second receiving means to the input terminals of said first and second detector means, respectively, impedance means to couple a portion of the detected voltage developed in one of said channels to the detector means associated with the other of said channels in such a manner as to block the current flow output of said other of said channels present in the other of said channels when the signal of the other of said channels is below the threshold level established by said portion of the detected voltage and to permit only that portion of the signal of said other of said channels which is above said threshold level to pass to the output of said other device, and means to combine the outputs of said first and second detectors, said impedance means including a first and second resistor, connected in series, coupling together the output terminals of said detecting means in a back-to-back manner and a third resistor coupled between said first and second resistors in a T arrangement and having a value greater than said first and second resistors, said third resistor having a given ohmic value and each of said first and second resistors having an ohmic value substantially equal to 0.414 times said given ohmic value to obtain substantially optimum combining of the signals of said first and second receiving channels in said combining means.

2. A diversity receiving combining system for use in a diversity reception system having a first and second receiving channel comprising first receiving means associated with said first channel and second receiving means associated with said second channel, first and second detector means each associated with one of said channels and each having first and second electrodes, means to couple the outputs of said first and second receiving means to the first electrodes of said first and second detector means, respectively, to cause current flow output from the second electrode of said first and second detector means in accordance with the signals of said first and second receiving channels, impedance means coupled between the second electrodes of said first and second detector means to couple a portion of the output of one of said detector means to the other of said detector means to oppose the current flow output of said other of said detector means, and means to combine the outputs of said first and second detector means, said impedance means including a first resistor and a second resistor connected in series coupled between the second electrodes of said detector means and a third resistor coupled at the junction of said first and second resistors and having a value greater than said first and second resistors, said third resistor having a given ohmic value and each of said first and second resistors having an ohmic value substantially equal to 0.414 times said given ohmic value to obtain substantially optimum combining of the signals of said first and second receiving channels in said combining means.

3. An electrical energy combining system comprising a first electrical energy source, a second electrical energy source, a first detector means having first and second electrodes, means coupling the first electrode of said first detector means to said first source to cause current flow output from the second electrode of said first detector means in accordance with the energy of said first source, a second detector means having first and second electrodes, means coupling the first electrode of said second detector means to said second source to cause current flow output from the second electrode of said second detector means in accordance with the energy of said second source, impedance means coupled between the second electrodes of said first and second detectors to couple a portion of the output of one of said detector means to the other of said detector means to oppose the current flow output of said other of said detector means, and means to combine the outputs of said first and second detector means, said impedance means including a first resistor and a second resistor connected in series coupled between the second electrodes of said detector means and a third resistor coupled at the junction of said first and second resistors and having a value greater than said first and second resistors, said third resistor having a given ohmic value and each of said first and second resistors having an ohmic value substantially equal to 0.414 times said given ohmic value to obtain substantially optimum combining of the signals of said first and second sources in said combining means.

References Cited in the file of this patent

UNITED STATES PATENTS

| | | |
|---|---|---|
| 2,513,811 | Matthews | July 4, 1950 |
| 2,610,292 | Bond et al. | Sept. 9, 1952 |

FOREIGN PATENTS

| | | |
|---|---|---|
| 727,279 | Germany | Oct. 30, 1942 |